US009036693B2

(12) United States Patent
Isnardi et al.

(10) Patent No.: US 9,036,693 B2
(45) Date of Patent: May 19, 2015

(54) METHOD AND SYSTEM FOR PROVIDING REGION-OF-INTEREST VIDEO COMPRESSION

(75) Inventors: Michael Anthony Isnardi, Plainsboro, NJ (US); Arkady Kopansky, Havertown, PA (US)

(73) Assignee: SRI International, Menlo Park, CA (US)

( * ) Notice: Subject to any disclaimer, the term of this patent is extended or adjusted under 35 U.S.C. 154(b) by 882 days.

(21) Appl. No.: 12/644,707

(22) Filed: Dec. 22, 2009

(65) Prior Publication Data

US 2010/0172404 A1 Jul. 8, 2010

Related U.S. Application Data

(60) Provisional application No. 61/143,279, filed on Jan. 8, 2009.

(51) Int. Cl.
H04N 11/04 (2006.01)
*H04N 19/80* (2014.01)
*G06T 9/00* (2006.01)
*H04N 19/61* (2014.01)
*H04N 19/117* (2014.01)
*H04N 19/17* (2014.01)

(52) U.S. Cl.
CPC .............. *H04N 19/80* (2014.11); *G06T 9/007* (2013.01); *H04N 19/61* (2014.11); *H04N 19/117* (2014.11); *H04N 19/17* (2014.11)

(58) Field of Classification Search
CPC ..................................................... H04N 19/61
USPC ..................................................... 375/240.01
See application file for complete search history.

(56) References Cited

U.S. PATENT DOCUMENTS

| 5,563,960 | A | 10/1996 | Shapiro |
| 6,118,820 | A | 9/2000 | Reitmeier |
| 6,477,201 | B1 * | 11/2002 | Wine et al. ............... 375/240.08 |
| 6,560,285 | B1 | 5/2003 | Reitmeier |
| 6,909,745 | B1 * | 6/2005 | Puri et al. .................. 375/240.01 |
| 6,937,773 | B1 * | 8/2005 | Nozawa et al. ............... 382/243 |
| 7,162,095 | B2 * | 1/2007 | Chen et al. ..................... 382/240 |
| 7,212,657 | B2 * | 5/2007 | Simon et al. ................... 382/118 |
| 7,474,794 | B2 * | 1/2009 | Boneh et al. ................... 382/239 |
| 7,706,627 | B2 * | 4/2010 | Frishman et al. .............. 382/268 |
| 7,792,376 | B2 * | 9/2010 | Mizuno .......................... 382/240 |
| 8,144,997 | B1 * | 3/2012 | Ding ............................. 382/232 |
| 8,300,707 | B2 * | 10/2012 | Sawa ........................ 375/240.27 |
| 8,326,058 | B2 * | 12/2012 | Taketa et al. ................... 382/232 |
| 8,345,983 | B2 * | 1/2013 | Noguchi et al. .............. 382/190 |
| 8,472,745 | B2 * | 6/2013 | Kameyama ................... 382/260 |

(Continued)

*Primary Examiner* — William C Vaughn, Jr.
*Assistant Examiner* — Luis M Perez
(74) *Attorney, Agent, or Firm* — Moser Taboada

(57) ABSTRACT

Embodiments of the present invention provide for a region-of-interest compression methodology wherein a variety of encoders may be utilized to perform video compression on a plurality of filtered video frames without the need to generate specific instructions for each of the variety of encoders. Embodiments of the present invention receive a video frame and create a region-of-interest map based on the received video frame. The region-of-interest map is utilized to create a filtered video frame based on the received video frame. This process may be repeated for each video frame within a video stream, thereby creating a plurality of filtered video frames. The plurality of filtered video frames is transmitted to an encoder for video compression.

12 Claims, 4 Drawing Sheets

(56) References Cited

U.S. PATENT DOCUMENTS

| | | | |
|---|---|---|---|
| 8,509,549 B2 * | 8/2013 | Schoeberl et al. | 382/235 |
| 8,532,394 B2 * | 9/2013 | Kameyama | 382/195 |
| 8,542,736 B2 * | 9/2013 | Har-Noy et al. | 375/240.12 |
| 8,599,209 B2 * | 12/2013 | Kameyama | 345/581 |
| 2005/0286741 A1 * | 12/2005 | Watanabe et al. | 382/107 |
| 2006/0159357 A1 * | 7/2006 | Mizuno | 382/239 |

* cited by examiner

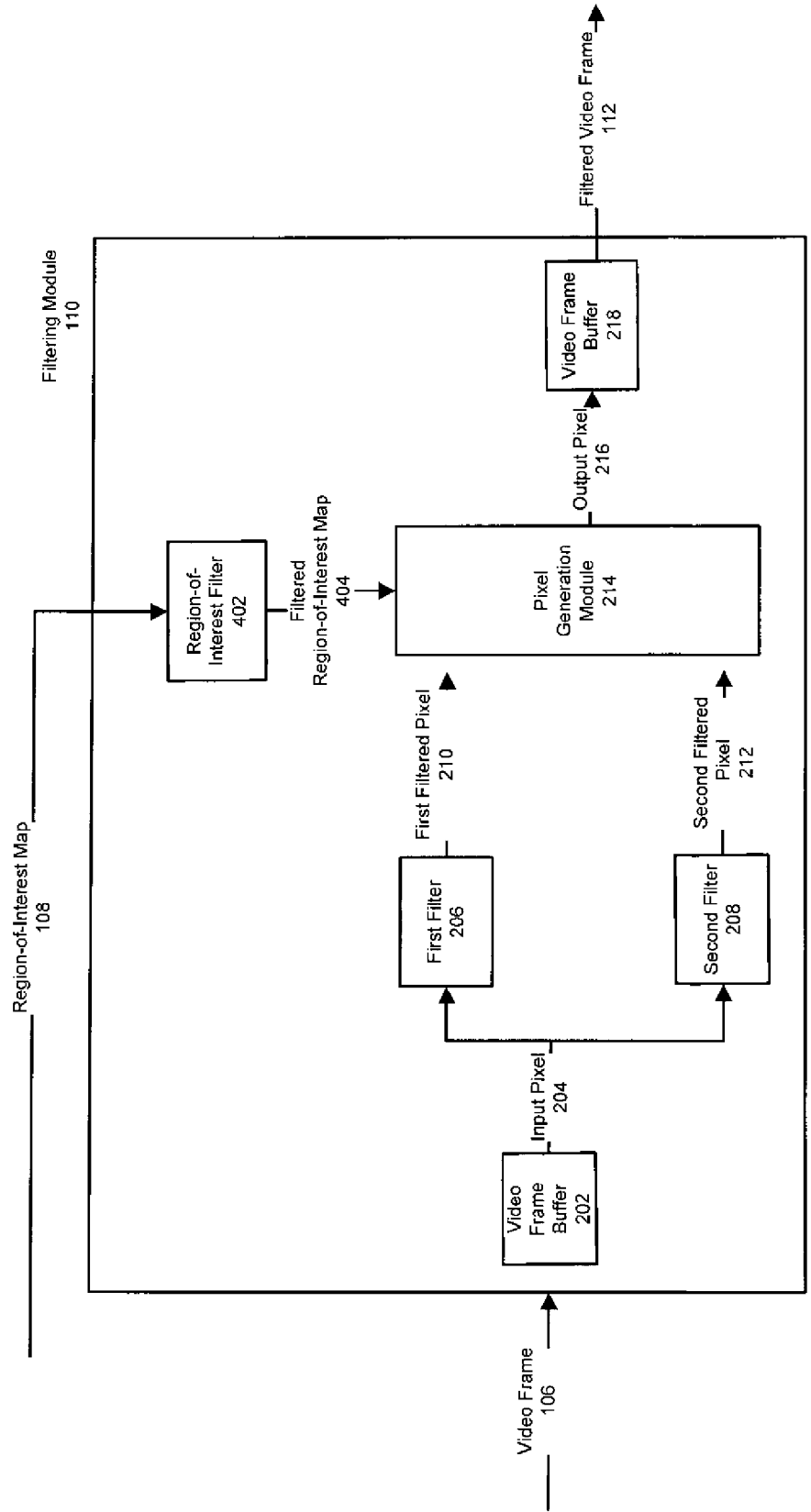

METHOD AND SYSTEM FOR PROVIDING REGION-OF-INTEREST VIDEO COMPRESSION

CROSS-REFERENCE TO RELATED APPLICATION

This application claims the benefit of U.S. Provisional Patent Application No. 61/143,279, filed Jan. 8, 2009 titled, "High-Quality Region-Of-Interest Compression Using Commercial Off-The-Shelf Encoders," which is herein incorporated by reference.

GOVERNMENTAL RIGHTS IN THIS INVENTION

The U.S. Government has a paid-up license in this invention and the right in limited circumstances to require the patent owner to license others on reasonable terms as provided for by the terms of contract order FA9200-07-0045-0020 awarded by the Department of the Air Force.

FIELD OF THE INVENTION

The present invention relates generally to video compression. More specifically, embodiments of the present invention relate to region-of-interest video compression.

BACKGROUND OF THE INVENTION

Region-of-interest video compression is often used when compressing a video stream comprising one or more regions-of-interest. The term "region-of-interest" is intended to include, but is not limited to, one or more areas within a video frame or plurality of video frames (i.e., a video stream) that contain information of interest to a viewer. For example, within a surveillance setting wherein a surveillance camera for a convenience store generates a video stream, the region-of-interest may be the portion of the video stream capturing the activity within the doorframe of the convenience store. If the video stream from the surveillance camera was to be used to identify a robber entering the convenience store, the portion of the video stream capturing the activity within the doorframe may be the most important information within the video stream. As such, the area within the doorframe would be referred to as the region-of-interest. At the same time, the information within the video stream representing the floor or ceiling may not be of particular importance and would not be defined as a region-of-interest. The region-of-interest may be a fixed location for all video frames included in a video stream, however, the location of a region-of-interest may move between video frames within a video stream. For example, if a region-of-interest corresponds to a moving body within a video stream, the location of the region-of-interest may shift from video frame to video frame in order to track the body's motion. In addition, the size of a region-of-interest may change between video frames.

Given that the region-of-interest is of greater importance than the non-region-of-interest, region-of-interest video compression functions to create a higher quality video image within the region-of-interest in comparison to the non-region-of-interest. As a result, region-of-interest compression applies a greater amount of video compression to the non-region-of-interest portion of a video stream in comparison to the region-of-interest-portion. This methodology minimizes the degradation of video quality within the region-of-interest while allowing for a greater amount of compression to be applied to the non-region-of-interest portion of the video. Therefore, the video quality within the region-of-interest may be maintained at a higher level, in comparison to the video quality outside of the region-of-interest.

According to conventional region-of-interest compression methods, applying different levels of video compression to a region-of-interest versus a non-region-of-interest requires the use of a region-of-interest parameter set. The region-of-interest parameter set dictates the level of compression to be applied to each region within a video frame. According to conventional region-of-interest compression methods, a parameter set generation module receives a video stream and creates a region-of-interest parameter set based on the video frames within the video stream. The region-of-interest parameter set includes detailed instructions dictating the way in which a given encoder is to compress each region within a corresponding video frame, herein referred to as the "compression instructions". In order for the encoder to effectively compress a given video frame, the parameter set generation module must create a region-of-interest parameter set in a language and/or format understood by the specific encoder that will be performing the video compression. As a result, the parameter set generation module must be configured to produce a region-of-interest parameter set that may be understood and effectively used by the encoder to compress the corresponding video frame.

According to conventional region-of-interest compression methods, if a new or alternative encoder is to be utilized, the configuration of the parameter set generation module must be altered to ensure that the parameter set generation module creates a region-of-interest parameter set understandable by the encoder. As a result, new or alternative encoders may not be introduced into a conventional region-of-interest compression method without modifying the parameter set generation module. Therefore, in instances where cheaper, more effective, or more efficient encoders are available, conventional region-of-interest compression methodologies do not allow for these encoders to be seamlessly integrated into the conventional compression methodologies.

As a result, there is a need in the art for a method, system or computer-readable medium for performing region-of-interest video compression, wherein a variety of encoders may be seamlessly coupled to or integrated into the method, system or computer-readable medium.

SUMMARY OF THE INVENTION

Embodiments of the present invention satisfy these needs and others by providing a method, system and computer-readable medium for performing region-of-interest video compression wherein a variety of encoders may be seamlessly coupled to or integrated into the method, system or computer-readable medium. Embodiments of the present invention create a filtered video stream wherein the region-of-interest within the filtered video stream is of a higher video quality than the non-region-of-interest. As used herein, the term "video stream" is intended to include, but is not limited to, a series of video frames that may be used to generate a video sequence. The term "video frame" is intended to include, but is not limited to, a portion of a video stream comprising a plurality of pixels. A video stream may represent live video captured by a video camera or other like sensors. Alternatively, the video stream may be non-live video fixed on a stored medium, such as a Digital Video Disc, hard drive, or other storage device.

Embodiments of the present invention create a filtered video stream based on a received video stream. As described above, the video stream may be live video or non-live video (e.g., stored). According to certain embodiments of the present invention, a region-of-interest map is created that corresponds to one or more of the video frames within the video stream. The term "region-of-interest map" is intended to include, but is not limited to, information that describes, defines, represents and/or identifies a location of one or more regions-of-interest within a video frame. For example, returning to the surveillance system described above wherein the region-of-interest is the portion of the video frame capturing the activity within a doorframe, the region-of-interest map may provide information describing the region of pixels containing the doorway within a video frame. Therefore, the region-of-interest map may be used to identify the region-of-interest within the video frame. Each region-of-interest map may locate a region-of-interest within one or more video frames of a video stream. As described in further detail below, the region-of-interest map may be in the form of an image, text file, or other data structure. A region-of-interest map does not specify the method of compression to be applied to a giving region within a video frame, as accomplished with compression instructions, instead the region-of-interest map simply identifies the region-of-interest, or regions-of-interest, within the corresponding video frame.

Given that video encoders automatically apply a greater level of video compression to blurrier, lower video quality regions (i.e., the non-region-of-interest) as compared to sharper, higher video quality regions (i.e., the regions-of-interest), an encoder may compress a filtered video frame without the need for encoder-specific compression instructions. Therefore, embodiments of the present invention may couple to a variety of different encoders without the need to create or transmit encoder specific compression instructions. This allows for a variety of different encoders to be coupled or integrated into embodiments of the present invention.

Following the creation of the region-of-interest map, the region-of-interest map and the corresponding video frames are used to create a filtered video frame. The filtered video frame represents a version of a video frame wherein the pixels within the non-region-of-interest have been subjected to a greater amount of filtering than the pixels within the region-of-interest. As a result, within the filtered video frame the video quality of the region-of-interest is higher than the video quality of the non-region-of-interest. This could cause the non-region-of-interest portion of the video frame to appear blurred. In contrast, the video quality within the region-of-interest portion of the video frame will remain at a higher video quality than the non-region-of-interest.

Embodiments of the present invention provide filtered video frames comprising, at least, high video quality region-of-interest and a low quality region-of-interest to an encoder, without providing the encoder with specific compression instructions. The encoder receiving the filtered video frame will automatically allocate fewer bits to the lower video quality regions (i.e., the non-region-of-interest) as compared to higher video quality regions (i.e., the regions-of-interest). As such, when compressing the filtered video frame according to an embodiment of the present invention, the encoder requires fewer bits to represent a non-region-of-interest than is required to represent the regions-of-interest. Therefore, the encoder effectively encodes the filtered video frame without specific compression instructions identifying the location of the region-of-interest within the video frame. Given that the encoder-specific compression instructions are not used to compress the filtered video frame, a new or alternative encoder may be seamlessly coupled with or integrated into the embodiments of the present invention. According to additional embodiments of the present invention, a new or alternative encoder could be integrated into a method, system or computer-readable medium of the present invention.

An embodiment of the present invention provides for a method of generating a filtered video frame, comprising the steps of receiving a video frame comprising a plurality of pixels, receiving a region-of-interest map, selecting a pixel from the plurality of pixels, filtering the pixel to create a high quality pixel, filtering the pixel to create a low quality pixel, and generating a filtered video frame based on the region-of-interest map by selecting either the high quality pixel or the low quality pixel to be included in the filtered video frame.

BRIEF DESCRIPTION OF THE DRAWINGS

The present invention will be more readily understood from the detailed description of exemplary embodiments presented below considered in conjunction with the attached drawings, of which:

FIG. 4 illustrates an alternative system for creating a filtered video stream, according to an embodiment of the present invention.

DETAILED DESCRIPTION OF THE DRAWINGS

The present invention relates to a method, system or computer-readable medium for performing region-of-interest video compression. According to certain embodiments of the present invention a region-of-interest map generation module receives a video stream comprising a plurality of video frames. The region-of-interest map generation module creates one or more region-of-interest maps corresponding to the video frames. Following the creation of the one or more region-of-interest maps, one or more filtered video frames are generated based on the video frames and the one or more region-of-interest maps. The filtered video frames may be compressed by an encoder and combined with a plurality of compressed video frames to create a compressed video stream.

Figure 1:
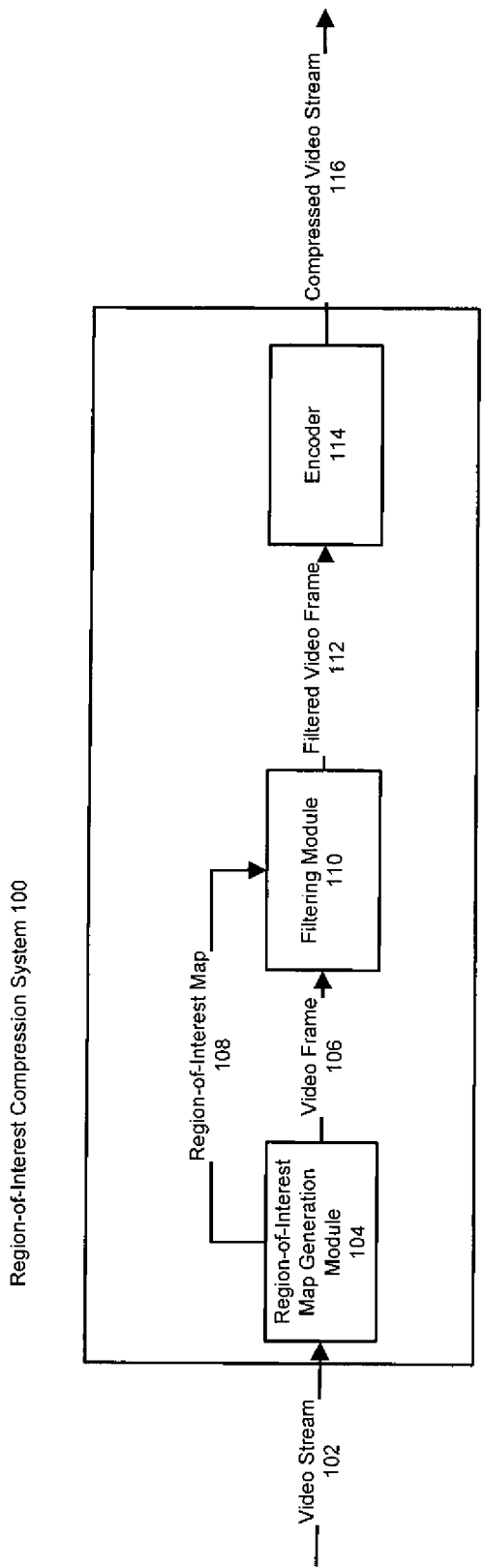
FIG. 1 illustrates an exemplary system for creating a compressed video stream, according to an embodiment of the present invention.

FIG. 1 illustrates a Region-of-Interest Video Compression System 100 according to an embodiment of the present invention. As illustrated in FIG. 1, the Region-of-Interest Video Compression System 100 may include a Region-of-Interest Generation Module 104, a Filtering Module 110, and an Encoder 114. As used herein, the term "module" is intended to include, but is not limited to, one or more computers configured to execute one or more software programs configured to perform one or more functions. The term "computer" is intended to include any data processing device, such as a desktop computer, a laptop computer, a mainframe computer, a personal digital assistant, a server, a handheld device, or any other device able to process data. The aforementioned components of the Region-of-Interest Video Compression System 100 represent computer-implemented hardware and software modules configured to perform the functions described in detail below. One having ordinary skill in the art will appreciate that the components of the Region-of-Interest Video Compression System 100 may be implemented on one or more communicatively connected computers. The term "communicatively connected" is intended to include, but is not limited to, any type of connection, whether wired or wireless, in which data may be communicated, including, for example, a connection between devices and/or programs within a single computer or between devices and/or programs on separate computers.

As illustrated in FIG. 1, the Region-of-Interest Video Compression System 100 receives a Video Stream 102. In an embodiment of the present invention wherein the Video Stream 102 represents live video, the Region-of-Interest Map Generation Module 104 may receive the Video Stream 102 from a video camera. The video camera could be capturing a live event, such as a sporting event or news event, or the video camera may be implemented as part of a surveillance system.

Following the receipt of the Video Stream 102, the Region-of-Interest Map Generation Module 104 creates one or more region-of-interest maps associated with the Video Stream 102. According to certain embodiments of the present invention, the Region-of-Interest Map Generation Module 104 may generate a region-of-interest map corresponding to each video frame within the Video Stream 102.

Alternatively, the Region-of-Interest Map Generation Module 104 may generate a region-of-interest map corresponding to more than one video frame within the Video Stream 102. In certain embodiments of the present invention, the Video Stream 102 may arrive at the Region-of-Interest Map Generation Module 104 at a frame rate higher than is required to generate a corresponding region-of-interest map for each video frame within the Video Stream 102. In order to ensure that the movement of video frames through the Region-of-Interest Map Generation Module 104 is not delayed by the generation of a region-of-interest map for each video frame, a unique region-of-interest map may not be created for each video frame. Instead, a region-of-interest map may be generated that corresponds to more than one video frame.

According to certain embodiments of the present invention, a region-of-interest map could be expressed in a variety of forms. For example, a Region-of-Interest Map 108 could be an image file wherein a black portion of the image may represent a non-region-of-interest and a white portion, or blob, may represent a region-of-interest. According to certain embodiments of the present invention wherein the region-of-interest map is an image, the dimensions of the images may be the same as the dimensions of the corresponding video frame. Alternatively, the region-of-interest map may not have the same dimensions as the corresponding video frame and as such the dimensions of the region-of-interest map may be adjusted to compensate for this disparity. In alternative embodiments of the present invention wherein the Region-of-Interest Map 108 is not an image file, the Region-of-Interest Map 108 may be a text file, Extensible Markup Language (XML) file, or any other data structure capable of identifying one or more regions-of-interest.

Following the creation of a Region-of-Interest Map 108, the Region-of-Interest Map Generation Module 104 may transmit the Region-of-Interest Map 108 to the Filtering Module 110. In addition to transmitting the Region-of-Interest Map 108, the Region-of-Interest Map Generation Module 104 provides the Filtering Module 110 with the Video Frame 106 or video frames that correspond to the transmitted Region-of-Interest Map 108. The Filtering Module 110 may receive the Region-of-Interest Map 108 corresponding to each video frame within the Video Stream 102. In such an embodiment, the Filtering Module 110 may utilize a different Region-of-Interest Map 108 when filtering each video frame. In an alternative embodiment of the present invention wherein the Filtering Module 110 does not receive a unique Region-of-Interest Map 108 corresponding to each Video Frame 106, a single Region-of-interest Map 108 may be used to filter more than one Video Frame 106.

The Filtering Module 110 is configured to filter the Video Frames 106 based on the corresponding Region-of-Interest Map 108. According to the embodiment of the present invention illustrated in FIG. 1, the Filtering Module 110 receives the Video Frame 106 from the Region-of-Interest Map Generation Module 104 and creates a Filtered Video Frame 112. The term "filtered video frame" is intended to include, but is not limited to, a video frame wherein one or more of the regions within the video frame have been altered. Such alterations may include, but are not limited to, blurring, inserting synthetic image data, or replacing one or more regions with a single color. Synthetic image data may be pixel patterns, such as slowly varying brightness or color regions, that are known to create very few bits. As an extreme case of a slowly varying pattern, a single color (e.g., a mid-grey level) can be used to replace the non-region-of-interest. Since a non-varying region uses the fewest bits to encode, such a non-varying region would result in the smallest possible bit allocation to the non-region-of-interest, albeit with no useful visual information preserved. The functionality of the Filtering Module 110 will be described in greater detail in reference to FIGS. 3 and 4.

When encoding a video frame, encoders may utilize fewer bits to represent a blurred or mono-colored portion of a frame in comparison to a higher resolution portion of the video frame. As a result, blurring a non-region-of-interest within a video frame may allow an encoder to reduce the number of bits required to encode the non-region-of-interest, thereby reducing the total number of bits required to encode the entire frame.

Furthermore, the process of utilizing fewer bits to encode a blurred region within a video frame in comparison to a higher resolution region is an automatic, standard function performed by most encoders, regardless of the compression protocol being used. As a result, many different encoders may compress the Filtered Video Frame 112. This allows embodiments of the present invention to upgrade encoders, switch compression protocols used by an encoder, or utilize a different brand encoder without the need to alter the functionality of the Region-of-Interest Map Generation Module 104 or the Filtering Module 110. Encoders implementing video compression standards, such as, but not limited to, H.261, H.263, Windows Media Video, MPEG-2, MPEG-4 visual, H.264/MPEG-4 part 10, VC-1, M-JPEG, M-JPEG2000 could encode the Filtered Video Frame 112, and therefore be seamlessly coupled with or integrated into an embodiment of the present invention.

Returning to FIG. 1, the Encoder 114 receives the Filtered Video Frame 112 from the Filtering Module 110. The Encoder 114 is configured to compress the Filtered Video Frame 112 through the use of a given video compression standard, such as H.264. Given that the Encoder 114 will inherently apply a great amount of video compression to the blurred, non-region-of-interest in contrast to the sharper region-of-interest, the Encoder 114 requires no additional information to effectively compress the Filtered Video Frame 112. Therefore, the Encoder 114 receives the Filtered Video Frame 112 and outputs the Compressed Video Stream 116.

Embodiments of the present invention effectively reduce the need for the Region-of-Interest Map Generation Module 104 to create a parameter set directed to a specific encoder. As a result, standard commercial off-the-self encoders may be used to encode the filtered video frames. The Filtering Module 110, described in greater detail in FIGS. 3 and 4, facilitates the decoupling of the Region-of-Interest Map Generation Module 104 and the Encoder 114.

Figure 2:
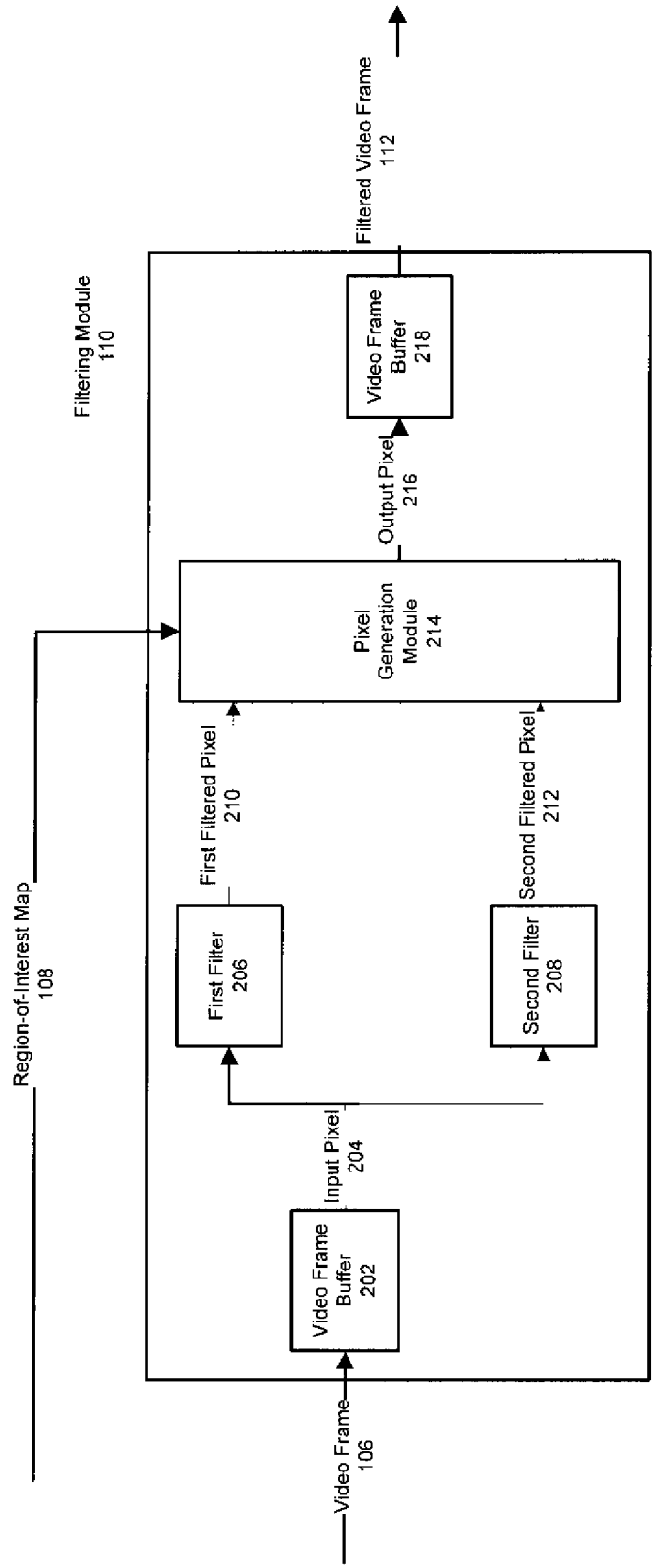
FIG. 2 illustrates an exemplary system for creating a filtered video stream, according to an embodiment of the present invention.

FIG. 2 illustrates a Filtering Module 110 according to an embodiment of the present invention. According to the Filtering Module 110 illustrated in FIG. 2, the First Video Frame Buffer 202 receives a Video Frame 106 from the Region-of-Interest Map Generation Module 104. The First Video Frame Buffer 202 is configured to store the Video Frame 106 and transmit one or more of the pixels associated with the Video Frame 106 to the First Filter 206 and the Second Filter 208. The First Video Frame Buffer 202 selects a pixel from the Video Frame 106, and transmits a copy of the selected pixel, as the Input Pixel 204, to the First Filter 206 and the Second Filter 208. According to certain embodiments of the present invention, the First Video Frame Buffer 202 may individually select and transmit all pixels associated with the Video Frame 106 to the First Filter 206 and the Second Filter 208.

According to certain embodiments of the present invention, the First Filter 206 and the Second Filter 208 may be low pass filters configured to filter the Input Pixel 204. Application of a low pass filter to the Input Pixel 204 may result in reducing the amount of spatial high-frequency energy, or texture, contained in the pixel. Given that spatial high-frequency energy produces sharp images, which may include high contrast edges and fine detail, filtering spatial high-frequency energy, or reduce the amount of spatial high-frequency energy contained in a pixel, will produce a blurred pixel.

The First Filter 206 and the Second Filter 208 may utilize any of a well-known number of filter methods, such as, for example, separable, non-separable, boxcar, triangular or Gaussian. Furthermore, the First Filter 206 and the Second Filter 208 may apply different strength filters. For example, the First Filter 206 may utilize a 5×5 Gaussian filter while the Second Filter may use a 25×25 boxcar filter. As a result, the First Filter 206 will produce a First Filtered Pixel 210 which may be less blurred than the Second Filtered Pixel 212 produced by the Second Filter 208. The contrast between the quality of the First Filter Pixel 210 and the Second Filter Pixel 212 may vary depending on the type and strength of filters used.

According to the embodiment of the present invention illustrated in FIG. 2, the Pixel Generation Module 214 receives the First Filtered Pixel 210 and the Second Filtered Pixel 212. In addition, the Pixel Generation Module 214 receives a Region-of-Interest Map 108. The Region-of-Interest Map 108 received by the Pixel Generation Module 214 corresponds to the Video Frame 106 and as result the Pixel Generation Module 214 uses the same Region-of-Interest Map 108 for all input pixels associated with the Video Frame 106. Furthermore, as described above, the Region-of-Interest Map 108 could correspond to more than one video frame. In an embodiment of the present invention where the Region-of-Interest Map 108 corresponds to more than one video frame, the Pixel Generation Module 214 may receive a single Region-of-Interest Map 108 for use with one or more video frames.

According to an embodiment of the present invention, the Pixel Generation Module 214 is configured to produce an Output Pixel 216 based on the First Filtered Pixel 210, Second Filtered Pixel 212 and the Region-of-Interest Map 108. The Pixel Generation Module 214 executes in either a switching mode or a mixing mode. In the switching mode, the Pixel Generation Module 214 selects either the First Filtered Pixel 210 or the Second Filtered Pixel 212 to be used as the Output Pixel 216. In the mixing mode, the Pixel Generation Module 214 creates the Output Pixel 216 based on a blend of the First Filtered Pixel 210 and the Second Filtered Pixel 212.

According to an embodiment of the present invention wherein the Pixel Generation Module 214 is in the switching mode, the Pixel Generation Module 214 will select either the First Filtered Pixel 210 or the Second Filtered Pixel 212 to be the Output Pixel 216. The Pixel Generation Module 214 will utilize the Region-of-Interest Map 108 to determine if the Input Pixel 204, which provided the basis for the First Filtered Pixel 210 and Second Filtered Pixel 212, was located within a region-of-interest. If the location of the Input Pixel 204 falls within a region-of-interest, the filtered pixel generated by the weaker filter will be selected and used as the Output Pixel 216. In contrast, if the location of the Input Pixel 204 does not fall within a region-of-interest, the filtered pixel generated by the stronger filter will be selected and used as the Output Pixel 216. As a result of this selection process, the Pixel Generation Module 214 will select the higher quality filtered pixels for the region-of-interest and the lower quality filtered pixels for the non-region-of-interest. This selection process will result in maintaining a higher quality region-of-interest in comparison to the non-region-of-interest.

Figure 3:
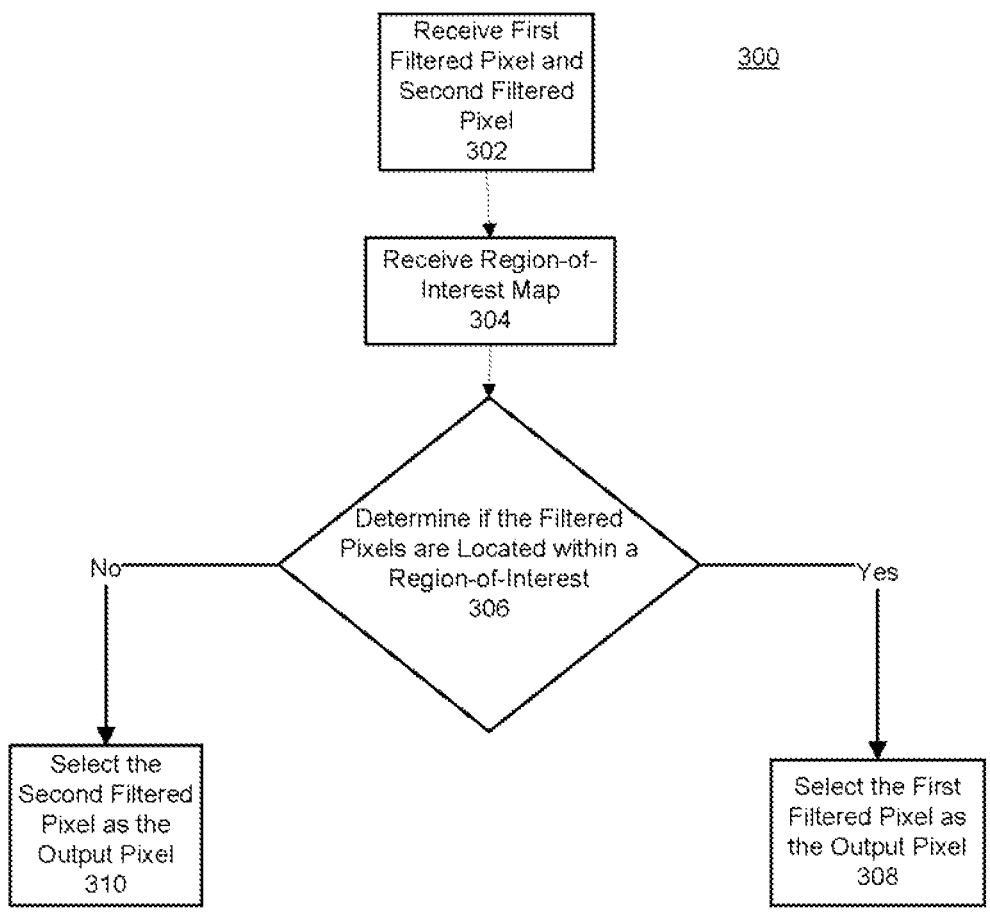
FIG. 3 illustrates an exemplary method for selecting an output pixel.

FIG. 3 is flowchart illustrating a method 300, which is an embodiment of the Pixel Generation Module 214 in the switching mode. Method 300 begins by receiving a First Filtered Pixel 210 and a Second Filtered Pixel 212, at step 302. By way of example, assume the First Filter 206 is a weak filter generating lightly filtered pixels and the Second Filter 208 is a strong filter generating highly filtered pixels. Therefore, the First Filtered Pixel 210 has higher video quality than the Second Filtered Pixel 212. Method 300 continues by receiving the Region-of-Interest Map 108, at step 304.

Having received the First Filtered Pixel 210, the Second Filtered Pixel 212, and the Region-of-Interest Map 108, Method 300 continues by determining if the pixels are located within a region-of-interest, at step 306. The Pixel Generation Module 214 utilizes the Region-of-Interest Map 108 to determine if the pixel is located within a region-of-interest. If the location of the pixel corresponds to a region-of-interest, method 300 continues to step 308 wherein the First Filtered Pixel 210 will be selected as the Output Pixel 216 because the First Filtered Pixel 210 was filtered less than the Second Filtered Pixel 212 and, as a result, this will facilitate the creation of a higher quality region-of-interest within a Filtered Video Frame 112. In contrast, if the location of the filtered pixels corresponds to the non-region-of-interest, method 300 continues to step 310 wherein the Second Filtered Pixel 212 will be selected as the Output Pixel 216 because the Second Filtered Pixel 212 was filtered more than the First Filtered Pixel 212 and, as a result, will facilitate the creation of a lower quality non-region-of-interest within the Filtered Video Frame 112.

As described above, the region-of-interest map may be an image, as illustrated in FIG. 2, a text file or any other data structure capable of identifying a region-of-interest. As a result, in an embodiment of the present invention wherein the region-of-interest map is a text file or data structure, the Pixel Generation Module 214 may interpret the text file or data structure to determine if the Input Pixel 204 which formed the basis for the First Filtered Pixel 210 and Second Filtered Pixel 212, was located within a region-of-interest.

Following the selection of the First Filtered Pixel 210 or Second Filtered Pixel 212, the selected Output Pixel 216 will be transmitted by the Pixel Generation Module 214 to the Second Video Frame Buffer 218. The Second Video Frame Buffer 218 is configured to store a plurality of Output Pixels 216 and constructs a Filtered Video Frame 112 based on the plurality, of Output Pixels 216. The Filtered Video Frame 112 generated by the Second Video Frame Buffer 218 represents a filtered version of the Video Frame 106 received by the First Video Frame Buffer 202. The Filtered Video Frame 112 is then transmitted to the Encoder 112.

The Filtered Video Frame 112 generated by the Second Video Frame Buffer 218 may be based on a plurality of filtered pixels. Given that the Pixel Generation Module 214 is configured to select highly filtered pixels for the non-region-of-interest portions of the video frame and lightly filtered pixels for the region-of-interest portions of the video frame, the non-region-of-interest portion of the frame may be blurred in comparison to the region-of-interest portions. As a result, when the Encoder 114 compresses the Filtered Video Frame 112, fewer bits may be used to encode the non-region-of-interest compared to a similarly sized region-of-interest. The Encoder 114 will effectively compress the Filtered Video Frame 112 based on the varied video quality between the region-of-interest and non-region-of-interest within the Filtered Video Frame 112. Therefore, no compression instructions are required by the Encoder 114 in order to compress the Filtered Video Frame 112.

FIG. 4 illustrates an alternative embodiment of the Filtering Module 110. In addition to the components described above in reference to FIG. 2, the Filtering Module 110 illustrated in FIG. 4 comprises a Region-of-Interest Map Filter 402. In an embodiment of the present invention wherein the Region-of-Interest Map 108 is an image, the Region-of-Interest Map Filter 402 is configured to perform low pass filtering of the Region-of-Interest Map 108 to create a Filtered Region-of-Interest Map 404. Filtering the Region-of-Interest Map 108 may create one or more intermediate regions, or grey regions, along the edges of the one or more regions-of-interest within the region-of-interest map. These intermediate regions may create a smoothed transition between the region-of-interest and non-region-of-interest.

For example, FIG. 2 illustrates an unfiltered region-of-interest map 200 wherein all pixels within the region-of-interest map 200 are either white or black. According to an embodiment of the present invention wherein the region-of-interest map utilizes an 8-bit color scheme, all of the pixels within the region-of-interest map 200 are either represented by a 0 (i.e., black) or 255 (i.e., white). According to an embodiment of the present invention wherein the Region-of-Interest Map Filter 402 performs low pass filtering of the Region-of-Interest Map 200, one or more intermediate regions surrounding the Region-of-Interest 204 may be created. The one or more intermediate regions may be represented by shades of grey, or numbers between 0 and 255. These intermediate regions may smooth the transition between the Region-of-Interest 204 and the Non-Region-of-Interest 202 with the Region-of-Interest Map 200. The Filtered Region-of-Interest Map 402 is transmitted to the Pixel Generation Module 214 to be used when generating the Output Pixel 216.

According to an embodiment of the present invention wherein the Pixel Generation Module 214 is in the switching mode, the Pixel Generation Module 214 will select between the First Filtered Pixel 210 and the Second Filtered Pixel 212 as described above regarding FIG. 2. Assuming that the First Filter 206 is weaker than the Second Filter 208, the Pixel Generation Module 214 will select the First Filtered Pixel 210 if it is determined that the Input Pixel 204 was located within the region-of-interest. Conversely, the Pixel Generation Module 214 will select the Second Filtered Pixel 212 if it is determined that the Input Pixel 204 was located within a non-region-of-interest.

However, in addition to the region-of-interest and non-region-of-interest portions, the Filtered Region-of-Interest Map 404 may also include intermediate regions. According to the embodiment of the present invention illustrated in FIG. 4, the Pixel Generation Module 214 may utilize a threshold parameter to determine if an Input Pixel 204 located within an intermediate region will be considered within the region-of-interest or outside of the region-of-interest. The threshold parameter is an adjustable attribute of the Pixel Generation Module 214 used to determine the spatial bounds of the region-of-interest.

According to certain embodiments of the present invention wherein the Filtered Region-of-Interest Map 404 is an image expressed in terms of 8-bit grey-level pixels, the threshold parameter may be expressed in terms of an 8-bit number. In such an embodiment, any location within the Filtered Region-of-Interest Map 404 with a pixel value above the given threshold value will be considered within the region-of-interest. For example, in such an embodiment of the present invention wherein the threshold parameter is 0, every location within the Filtered Region-of-Interest Map 404 with a pixel above 0 (i.e., any non-black location) will be considered part the region-of-interest. In such an example, any pixel within the intermediate region of the Filtered Region-of-Interest Map 404 will be considered part of the region-of-interest. On the opposite extreme, wherein the threshold level is 254, or one level below maximum white, the region-of-interest will be limited to the maximum white (level 255) portions of the Filtered Region-of-Interest Map 404 and as a result none of the pixels within the intermediate region of the Filtered Region-of-Interest Map 404 will be considered to be part of the region-of-interest. According to alternative embodiments of the present invention, wherein the threshold parameter is expressed in terms of an 8-bit number, the threshold parameter may also be set to any number between 0 and 255.

Therefore, the Pixel Generation Module 214 will select between the First Filtered Pixel 210 and the Second Filtered Pixel 212 based on the location of the Input Pixel 204, the threshold parameter and the Filtered Region-of-Interest Map 404. The Pixel Generation Module 214 then transmits the selected Output Pixel 216 to the Second Video Frame Buffer 218.

In an alternative embodiment of the Filtering Module 110 illustrated in FIG. 4, the Pixel Generation Module 214 may operate in the mixing mode. In the mixing mode, the Pixel Generation Module 214 generates an Output Pixel 216, or blended pixel, based on a blend of the First Filtered Pixel 210 and the Second Filtered Pixel 212. According to an embodiment of the present invention wherein the Pixel Generation Module 214 is operating in the mixing mode, the Pixel Generation Module 214 may utilize alpha blending to generate the Output Pixel 216. In such an embodiment, the Pixel Generation Module 214 may first calculate a blending parameter alpha, $\alpha$, to be used for a given First Filtered Pixel 210 and the Second Filtered Pixel 212 pair. Alpha may be calculated based on the following formula:

$$\alpha = (R-L)/(H-L) \qquad \text{[Equation 1]}$$

wherein the region-of-interest map pixel value, R, represents the value of the pixel within the Filtered Region-of-Interest Map 404 associated with the location of the Input Pixel 204. For example, assuming the Filtered Region-of-Interest Map 404 is an image with 8-bit pixels, if the location of the Input Pixel 204 corresponds to a black portion of the Filtered Region-of-interest Map 404, R will be equal to 0. In contrast, if the location of the Input Pixel 204 corresponds to a white portion of the Filtered Region-of-Interest Map 404, R will be equal to 255. If the Input Pixel corresponds to a grey portion of the Filtered Region-of-Interest Map 404, R will be between, but not including, 0 and 255. The L value used in Equation 1 is the lowest possible pixel value within the Filtered Region-of-Interest Map 404 and the H value is the highest possible pixel value within the Filtered Region-of-Interest Map 404. In an embodiment of the present invention wherein the Filtered Region-of-Interest Map 404 is based on 8-bit pixels, L will be equal to 0 and H will be equal to 255.

Once alpha has been calculated, the Pixel Generation Module 214 may generate the Output Pixel 216 based on the following equation:

$$\text{Output Pixel}=(\alpha*\text{First Filtered Pixel Value})+((1-\alpha)*\text{Second Filtered Pixel Value}).  \quad\text{[Equation 2]}$$

As a result, in an embodiment of the present invention wherein the Pixel Generation Module 214 is in mixing mode, the Output Pixel 216 may be a blend of the First Filtered Pixel and the Second Filtered Pixel. Following the generation of the Output Pixel 216, the Output Pixel is transmitted to the Video Frame Buffer 218.

According to an alternative embodiment of the present invention, the Filtering Module 110 illustrated in FIG. 2 may also receive a Filtered Region-of-Interest Map 404 as described in FIG. 4. In such an embodiment, the Pixel Generation Module 214 may operate in either the switching mode or the mixing mode to generate an Output Pixel 216, as described above.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

The invention claimed is:

1. A method for compressing a video stream comprising:
receiving one or more region-of-interest maps which define one or more regions of interest across corresponding video frames of the video stream;
applying, for each video frame, a first spatial filter to a first set of pixels of the video frame to generate a first set of filtered pixel values, and
applying a second spatial filter to a second set of pixels of the video frame to generate a second set of filtered pixel values,
wherein the first spatial filter reduces an amount of high spatial frequency energy in the pixels and the second spatial filter reduces a greater amount of high spatial frequency energy in pixels than the first spatial filter;
forming, for each video frame, a filtered video frame comprising a plurality of filtered pixel values, each of said filtered pixel values of the filtered video frame being derived based on:
(a) a value in a corresponding location of the one or more reaction-of-interest maps corresponding to the video frame, and
(b) a filtered pixel value in a corresponding location from at least one of the first set and second set of filtered pixel values;
forming a spatially filtered video stream comprising each of the filtered video frames; and
providing the spatially filtered video stream to a standard video encoder for encoding the spatially filtered video stream,
wherein the standard video encoder automatically assigns fewer bits to regions with less high spatial frequency energy and more bits to regions with greater higher spatial frequency energy.

2. The method of claim 1, wherein:
one or more of the filtered pixel values of the filtered video frame is derived by selecting a filtered pixel value from the first set of filtered pixel values, for pixel locations inside the region of interest defined by the one or more region-of-interest maps; and
one or more of the filtered pixel values of the filtered video frame is derived by selecting a filtered pixel value from the second set of filtered pixel values, for pixel locations outside the region of interest defined by the one or more region-of-interest maps.

3. The method of claim 2 wherein a threshold value parameter is applied to a real-valued region of interest map to determine if a pixel is located within the one or more region of interests.

4. The method of claim 1 wherein blending the first set of pixels and the second set of pixels comprises selecting either a pixel from the first set of pixels or a pixel from the second set of pixels.

5. The method of claim 1, wherein the first and second filter comprise one of separable, non-separable, boxcar, triangular or Gaussian filters.

6. The method of claim 1, wherein one or more of the filtered pixel values of the filtered video frame is derived by blending:
(a) a filtered pixel value from the first set of filtered pixel values for a corresponding pixel location and
(b) a filtered pixel value from the second set of filtered pixel values for a corresponding pixel location, wherein said blending is weighted based on a value of the corresponding region-of-interest map for a corresponding pixel location.

7. An apparatus for compressing a video stream prior to standard encoding, the apparatus comprising a processor that executes a filtering module that:
receives one or more region-of-interest maps which define one or more regions of interest across corresponding video frames of the video stream;
applies, for each video frame, a first spatial filter to a first set of pixels of the video frame to generate a first set of filtered pixel values, and applies
a second spatial filter to a second set of pixels of the video frame to generate a second set of filtered pixel values,
wherein the first spatial filter reduces an amount of high spatial frequency energy in the pixels and the second spatial filter reduces a greater amount of high spatial frequency energy in pixels than the first spatial filter;
forms, for each video frame, a filtered video frame comprising a plurality of filtered pixel values, each of said filtered pixel values of the filtered video frame being derived based on:
(a) a value in a corresponding location of the one or more reaction-of-interest maps corresponding to the video frame, and
(b) a filtered pixel value in a corresponding location from at least one of the first set and second set of filtered pixel values;
forms a spatially filtered video stream comprising each of the filtered video frames;
and provides the spatially filtered video stream to a standard video encoder for encoding the spatially filtered video stream, wherein the standard video encoder automatically assigns fewer bits to regions with less high spatial frequency energy and more bits to regions with greater higher spatial frequency energy.

8. The filtering module of claim 7, wherein the filtering module applies a blending function that creates smooth transition regions along edges of the one or more regions of interest.

9. The apparatus of claim 7, wherein one or more of the filtered pixel values of the filtered video frame is derived by selecting a filtered pixel value from the first set of filtered pixel values, for pixel locations inside the region of interest defined by the one or more region-of-interest maps; and one or more of the filtered pixel values of the filtered video frame is derived by selecting a filtered pixel value from the second set of filtered pixel values, for pixel locations outside the region of interest defined by the one or more region-of-interest maps.

10. The apparatus of claim 9 wherein a threshold value parameter is applied to a real-valued region of interest map to determine if a pixel is located within the one or more region of interests.

11. The apparatus of claim 7 wherein blending the first set of pixels and the second set of pixels comprises selecting either a pixel from the first set of pixels or a pixel from the second set of pixels.

12. The apparatus of claim 7, wherein the first and second filter comprise one of separable, non-separable, boxcar, triangular or Gaussian filters.

\* \* \* \* \*